United States Patent [19]

Rosen

[11] 4,269,280

[45] May 26, 1981

[54] PROPULSION SYSTEM FOR AUTOMOTIVE VEHICLES

[76] Inventor: Charles L. Rosen, 277 Churchill Rd., Teaneck, N.J. 07666

[21] Appl. No.: 903,104

[22] Filed: May 5, 1978

[51] Int. Cl.³ .................. B60L 15/38; B60K 9/00
[52] U.S. Cl. .................. 180/54 C; 60/711; 180/65 A
[58] Field of Search .......... 180/65 A, 65 R, 54 C, 180/105, 11; 60/711, 709; 290/4 C

[56] References Cited

U.S. PATENT DOCUMENTS

| | | | |
|---|---|---|---|
| 2,192,714 | 3/1940 | Norman et al. | 180/105 R |
| 3,543,873 | 12/1970 | Toy | 180/65 A |
| 3,732,751 | 5/1973 | Berman et al. | 180/65 A |
| 3,791,473 | 2/1974 | Rosen | 180/65 A |
| 3,923,115 | 12/1975 | Helling | 180/65 A |
| 4,042,056 | 8/1977 | Horwinski | 180/65 A |

Primary Examiner—David M. Mitchell

[57] ABSTRACT

The propulsion system includes a battery powered or combustion powered prime mover and a secondary or auxiliary mover. When the prime mover is battery powered, the secondary mover is controlled so as to optimize the use of the electrical energy stored in the batteries, while using the secondary mover, when necessary, to supply auxiliary power when required for vehicle performance. This is done by keeping the prime mover operating, primarily, in the low to moderate current range, where energy loss in the battery is low and controlling the secondary mover to supply as much power as is necessary to keep the battery drain as near as possible to a preselected threshold value. When the prime mover is combustion powered, the secondary mover is similarly controlled to keep the prime mover within the torque range of most efficient operation. The propulsion system is used either to power a hybrid low pollution vehicle or to provide auxiliary power to a battery operated vehicle to extend its range or enable it to pull occasional heavy loads (e.g. a trailer).

2 Claims, 16 Drawing Figures

PROPULSION SYSTEM FOR AUTOMOTIVE VEHICLES

BACKGROUND OF THE INVENTION (1) Field of the Invention

This invention relates to multiple power source vehicles, and more particularly to improved control techniques for such vehicles.

(2) Brief Description of the Prior Art

Until recently, the major impetus for interest in electric vehicles was due to their potential for reducing vehicular emissions—a major problem in congested urban areas. The realization that our petroleum resources are finite and that the availability of petroleum is already beginning to diminish has renewed interest in electric vehicles as alternatives to the petroleum consuming combustion engine vehicles. Electric vehicles utilize power which can be generated from sources other than petroleum, such as coal or nuclear reactors, thus allowing some of the transportation energy base to be shifted from petroleum to non-petroleum sources. The effectiveness of such a strategy depends upon the acceptance and use of electric cars by the public.

Up to the present time, the major limitations to the acceptability of battery propulsion for automotive applications have been the limited range and low acceleration, poor hill climbing, and low top speed capabilities of such battery powered vehicles resulting from the low energy and low power densities of existing batteries.

The battery for an electric vehicle is heavy and comprises a large fraction of the total system weight. It is known that for an electric vehicle to be safe, the size of the battery should be determined not only by its capability to supply sufficient electrical power for immediate driving requirements, but by its reserve performance capability to supply sufficient electrical power to accelerate or climb hills if required. The reserve power capability of conventional batteries decreases markedly as the battery is discharged. This limits the depth to which a battery can be discharged before reaching the threshold of unsafe vehicle performance capability. This leads to a heavier battery than would be required if deeper discharge could safely be achieved.

It is known, in general, that battery systems are more efficient at low current drains and electric motors are most efficient at certain current loadings.

The prior art contains examples of the use of combustion engine power to supplement a battery powered mover in order to minimize the limitations of battery powered vehicles with respect to battery size, range, and power and to reduce the current drain of the battery. Various of these prior attempts have suffered from the following disadvantages: they have produced a decrease in the energy efficiency of the system, they have led to a decrease in the utilization of off-board generated electricity per trip-mile, they have increased the complexity of the system, and they have led to a sizable increase in the initial cost of the system.

In a method described by Pieper, U.S. Pat. No. 913,846, issued Mar. 2, 1909, an electric motor and a combustion engine are coupled to run at a fixed speed ratio to each other. The vehicle operator commands performance from the electrical system and the combustion engine throttle is controlled automatically so as to keep the battery voltage within prescribed limits. Several drawbacks are attendant to this means of operation. Battery voltage is dependent on state-of-charge, rate of discharge, temperature, as well as other factors, and requires complex computations and controls to compensate for the various factors and so keep the battery at a desired state-of-charge.

SUMMARY OF THE INVENTION

The invention disclosed herein is a propulsion apparatus including a prime mover and a secondary, or auxiliary, mover, which is controlled so as to achieve efficient use of energy resources. For battery powered prime movers, the disclosed invention causes the battery to be discharged in the more efficient, low current drain manner as much as possible. To accomplish this objective, the control signal to the secondary mover can be such that, for low current drains, the prime mover battery supplies all of the power but that above a certain predetermined threshold current drain from the battery, the secondary mover begins supplying power in such amounts as to reduce the current utilization of the prime mover to the predetermined threshold level. Suitable control signals for the secondary mover in addition to battery current are accelerator pedal position, torque of the motor, or current level in the motor. Normally, except as related through a control signal, the control of the operation of the secondary mover is independent of the control of the operation of the prime mover.

The full power capability of the secondary mover can be continuously applied at all times to keep the current drain at the predetermined threshold level. With the instant invention, the additional high-current power capability of the prime mover (over and above the threshold value) can be called upon after the capability of the secondary mover has been utilized. This produces a maximum utilization of the prime mover at or below the threshold operating level and yet allows the full power capability of the prime mover to be utilized when required.

The instant invention produces more use of the secondary mover at just above the threshold level, because, in the instant invention, the prime mover stops increasing its power after reaching the predetermined threshold level. In the prior art, even when the prime mover is being assisted by the secondary mover, both continue to increase their power response to higher power commands from the vehicle operator. Even if the prior art employed a delay in the activation of the secondary mover so that the secondary mover did not come into play until some predetermined current drain was exceeded, the prime mover would be increasing its current at the same time the secondary mover was increasing its current after that predetermined level, thereby only obtaining a partial benefit. If the secondary mover does not come in until after the prime mover capability is exhausted, no efficiency benefit is achievable. By use of the instant invention, the amount of off-board generated electricity to be used on a trip-mile basis can be maximized.

A vehicle driven by the propulsion system of the instant invention will be able to be used as an all-electric vehicle for most urban trips, thereby obtaining the advantages of an electric vehicle, or as a hybrid when required for long trips. As a hybrid, the instant invention extends the range of battery powered vehicles by supplying some of the traction energy from a secondary source.

DETAILED DESCRIPTION OF THE INVENTION

1. Prime Mover Control

Figure 1:
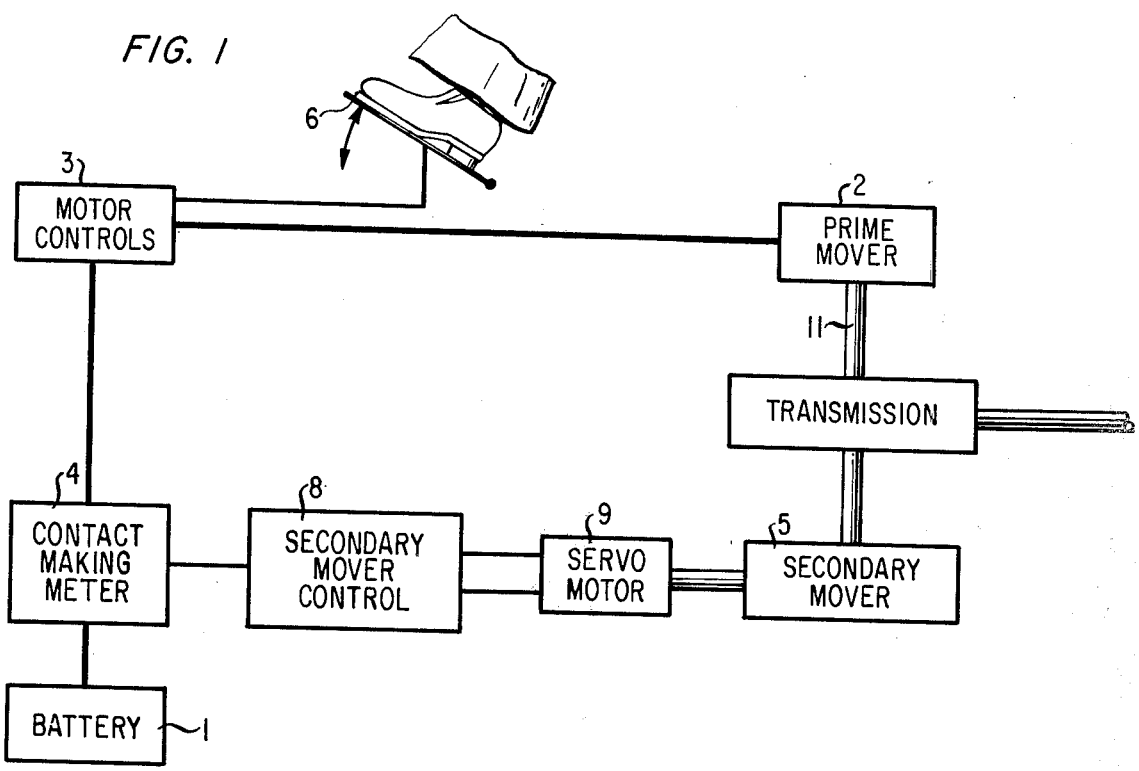
FIG. 1 is a block diagram of an exemplary propulsion system of the invention.

In FIG. 1, a traction battery 1 is used to supply power to the prime mover 2. The amount of current drawn from the battery 1 is controlled and adjusted by any of the means known to those versed in the art by control 3 in response to an operator actuated indicator (e.g. accelerator pedal 6) to produce a desired speed. The instant invention is usable with the various types of prime mover electric motors described in the art, for example DC series, DC shunt, DC compound, AC Induction, or AC synchronous. The instant invention is usable with the various kinds of control systems for these motors, for example resistive controls, solid state controls, or battery switching.

2. Secondary Mover Control Signals

A. Battery Current

Figure 2:
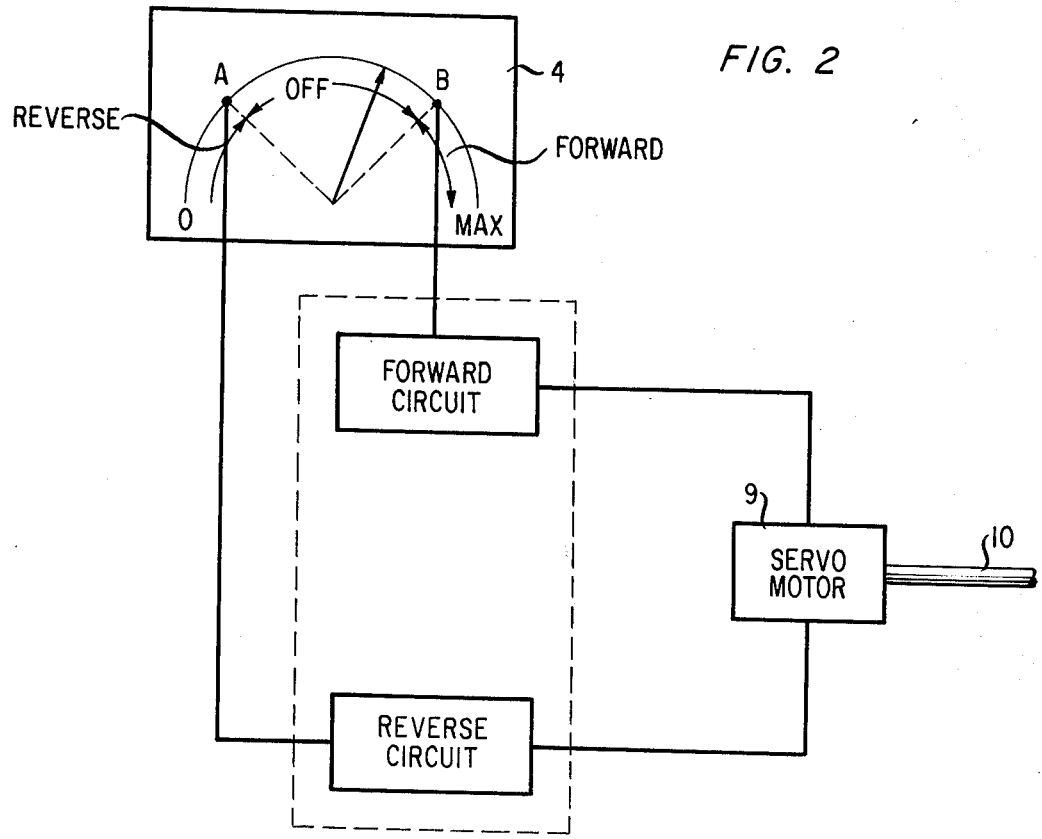
FIG. 2 is a block diagram of exemplary control circuitry.

In the embodiment of this invention illustrated in FIG. 1, the traction battery current is monitored by a contact making meter 4. In a contact making meter, contacts are opened or closed as the current through the meter rises or falls past predetermined set points. When the battery current is above set point B on the contact making meter 4 (a block diagram of the control circuitry of which is shown in detail in FIG. 2), the contact making meter activates a circuit 8 which acts to progressively increase the power of the secondary mover 5 to its maximum extent or until the current falls below set point B on the contact making meter 4, at which point the circuit causing the secondary mover 5 to increase its power is de-energized and the secondary mover control remains set in the position it held when the circuit was turned off. This is accomplished by activating a servo motor which operates a mechanical linkage 10 to the power regulator of the secondary mover 5.

Each time the traction battery current again exceeds the value represented by point B, circuit 8, whose purpose is to increase the secondary mover power, is energized, and again acts to further increase the secondary mover power. When the battery current falls below set point A on the contact making meter 4, the circuit 8 is energized so as to cause the secondary mover to progressively decrease its power. Circuit 8 remains active and the secondary mover continues to decrease its power until the traction battery current exceeds set point A on contact making meter 4 or until the secondary mover is at its lowest operating point.

The result of this action is that the secondary mover operates in such a manner as to try to maintain the traction battery current at or below that level represented by set point B on the contact making meter 4.

In a typical embodiment, the vehicle operator calls for more or less vehicle power by the position of a lever control such as a foot pedal 6 shown in FIG. 1. In the instant invention the operator controls such an accelerator 6 in the usual manner and the control system automatically operates to maintain the predetermined level of operation of the prime mover.

B. Torque

Figure 3:
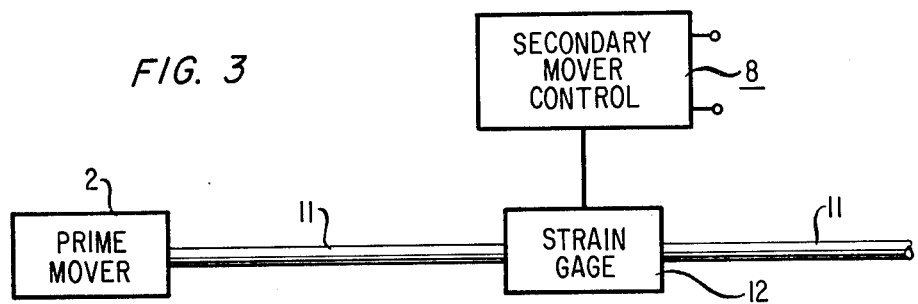
FIG. 3 is a block diagram showing a torque measuring device on the output shaft of the prime mover.

Signals other than current, such as torque, can be used as a signal to control the secondary mover power level. In a particular embodiment, a strain gage 12 is included in the system as the sensor of the state of stress of the prime mover. FIG. 3 shows such a torque measuring device on the output shaft of the prime mover 1. Whenever the torque is above a preset level, a circuit is activated to increase the power output of the secondary mover 5. The torque level, as sensed by the strain gauge 12, can be used to operate a control system similar to that of FIG. 2 in order to produce the same type of control of the prime mover power.

Figure 4:
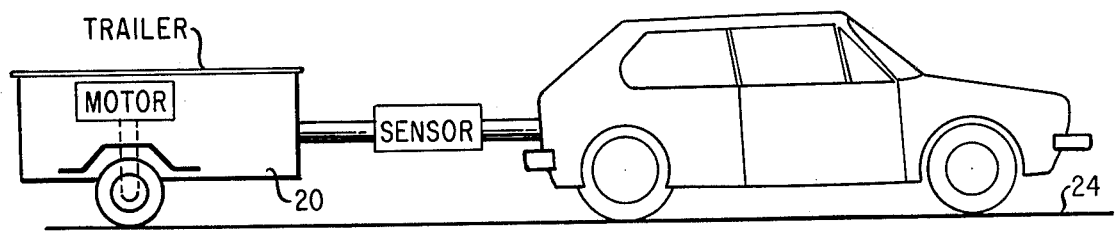
FIG. 4 is an elevational view, partially schematic, of a propulsion system with the secondary mover in a trailer.

Within the spirit of this invention the torque can be monitered at any of several locations instead of at the output of the prime mover 2. The necessary consideration is that the torque be monitored and used for control at a location that enables the torque produced by the primary mover 2 to be differentiated from the torque produced by the secondary mover. It is the torque produced by the action of the prime mover 2 that is used for control of the secondary mover 5. For example, as shown in FIG. 4, if the secondary mover 5 is contained in a trailer 20, a strain gage 12 can be incorporated into the connecting linkage 13 between the main vehicle 22 and the trailer 20. The strain in this linkage 13 is the indicator of the state of stress of the prime mover 2. The output signal of the strain gauge 12 is used as above to control the secondary mover 5.

C. Motor Current

Figure 5:
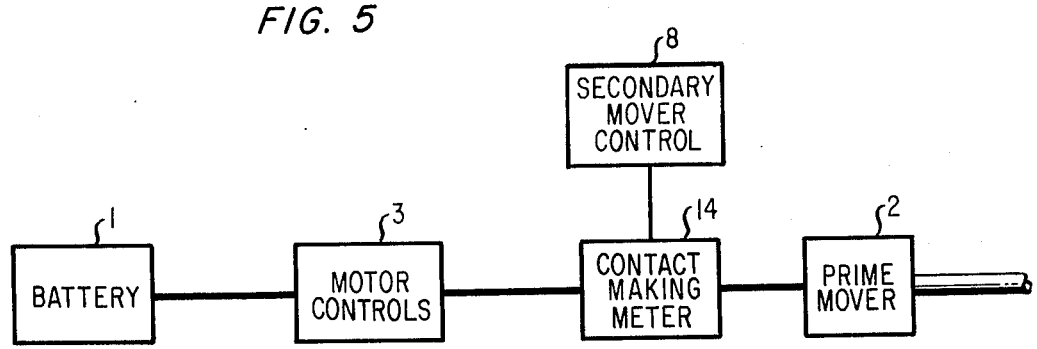
FIG. 5 is a block diagram of a control arrangement in which a contact making meter monitors the prime mover current.

Depending on the electric motor and control system that are used for the prime mover, the rms battery current may be different from the rms motor current. For example, if a silicon controlled rectifier circuit with pulse width modulation is used, the motor current will be higher than the traction battery current at low speeds. The electrical efficiency of the electric motor depends on the motor current. A contact making meter 14 positioned to monitor the motor current as shown in FIG. 5 can be used as a signal to control the secondary mover power level. Whenever the current exceeds the threshold value of B on the contact making meter 14 a circuit is activated tending to increase the power level of the secondary mover 5. The operation of contact making meter 14 is analogous to that of contact making meter 4, previously described. Use of motor current rather than battery current enables a more direct accounting to be made of the efficiency of the prime mover at low motor currents than if battery current is used as the control signal.

D. Pedal Position

Figure 6:
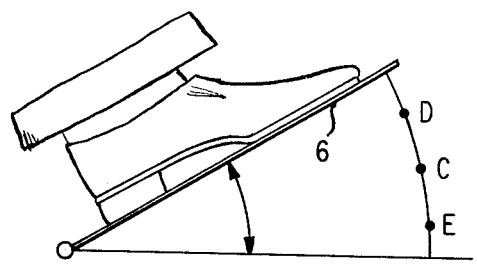
FIG. 6 is an elevational view, partially schematic, of a foot pedal control.

The position of the foot pedal 6 or other device commonly used by the vehicle operator (generally described as a lever control) can be used as a signal to control the secondary mover power level. As shown in FIG. 6, when the pedal 6 position reaches set point C, a circuit is activated that tends to increase the power output of the secondary mover. As before, when the pedal 6 position is at a greater angle than set point D, a circuit is activated that tends to decrease the power output of the secondary mover. The operation of the foot pedal control is similar to the operation of the contact making meter 4. The objective of all of these controls is to have the secondary mover supply the required power level to keep the foot pedal at a greater angle than set point C.

2. Secondary Mover Control

A. Servo Motor

Figure 7:
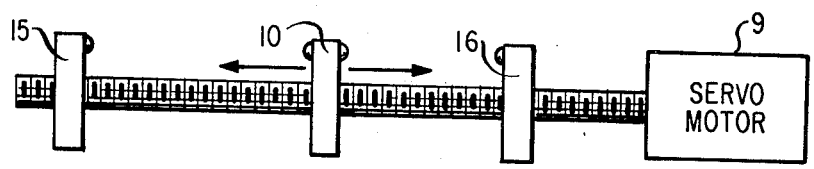
FIG. 7 is a schematic view of an exemplary engine throttle control.

The secondary mover may be a combustion engine whose power output is controlled by means of a throttle. Throttle will be used as a generic term to refer to throttling the air flow as in a typical Otto cycle spark ignition engine or to throttling the fuel flow as in a Diesel compression ignition engine. Throttling is used to mean reducing the output power. An embodiment of a means for controlling an engine throttle is shown in FIG. 7. When circuit 8 is activated to increase the power in the secondary mover it energizes servo motor 9 to turn in a clockwise direction (i.e., in that direction which causes an increase in the secondary mover power). As the servo motor rotates in the forward direction it drives a linkage 10 between two switch stops 15 and 16. The linkage 10 is attached to the secondary mover engine throttle and when the servo motor 9 turns in the forward direction, it tends to open the throttle. When the servo motor 9 turns in the reverse direction, the linkage tends to close the throttle. Typically, the secondary mover throttle is kept closed by a spring and the linkage tends to open the throttle. Relaxing the linkage allows the spring to close the throttle.

The switches 15 and 16 are used to de-energize the servo motor 9 circuit whenever the desired limit of travel of the throttle has been achieved, and thus not damage the system.

The control system 8 can be made to drive the servo motor 9 with a speed that is proportional to the amount of additional power required of the secondary mover to bring the prime mover to the threshold level of power or control system 8 can merely energize the servo motor to run at a constant rate (i.e., on or off in forward or reverse).

B. Direct Mechanical

Figure 8:
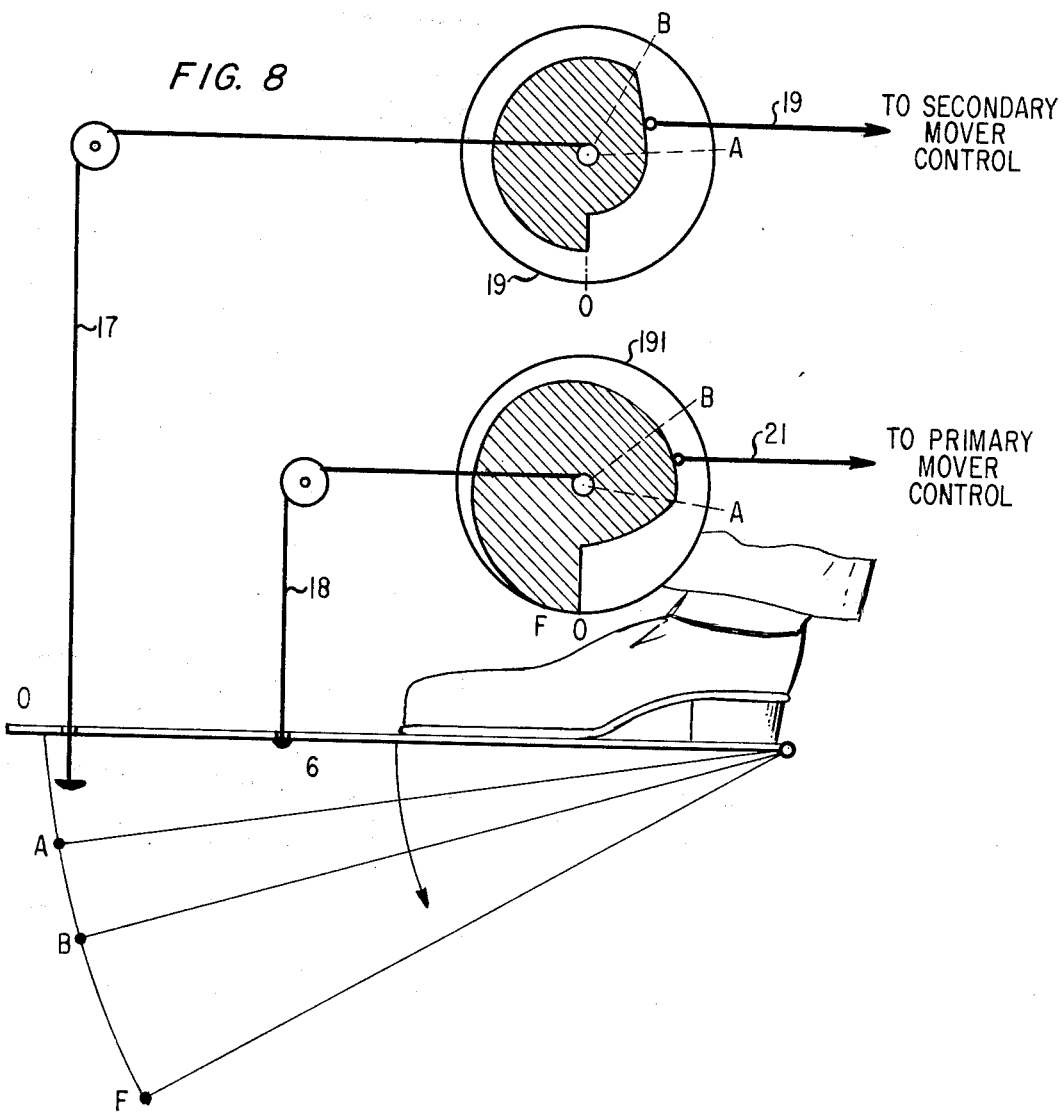
FIG. 8 is an elevational view, partially schematic, of an exemplary mechanical control arrangement.

In addition to embodiments of this invention in which operator commands activate a circuit 8 which controls the secondary mover, the secondary mover can be controlled by a mechanical linkage connected to the accelerator pedal. In one specific embodiment, the mechanical linkages 17 and 18 are connected between the accelerator pedal 6 and the control cams 19, 191 as shown in FIG. 8. The control cams 19, 191 can be two separate portions that may or may not be physically adjacent to one another. One portion of the cam 191 controls the prime mover 2. It consists of a section of increasing radius. The cam 191 acts on another linkage 21 (a cam follower) that operates the prime mover control. The accelerator foot pedal between point O and point A corresponds to motion of the linkage 18 on the increasing radius portion of the cam 191, increasing the prime mover power.

Travel of the accelerator foot pedal between points A and B corresponds to the constant radius portion of the cam 191 contacting the prime mover control. During this portion of the accelerator pedal travel, the prime mover power remains constant.

Travel of the accelerator foot pedal between points B and F cause the cam 191 to engage the prime mover control on the final increasing radius section of the cam 191, further opening the prime mover throttle.

The second portion 19 of the cam controls the secondary mover 5. It consists of a constant radius portion, an increasing radius portion, and a larger constant radius portion. Travel of the accelerator pedal between points O and A causes the secondary mover throttle to engage the constant radius portion and thus not increase its power. Travel of the accelerator pedal between points A and B cause the engine throttle to engage the cam 19 on the increasing radius portion and thus increase its power. Further depression of the accelerator pedal causes no increase of engine power since the cam 19 now engages the engine throttle linkage on the larger constant radius portion of the cam 19.

It should be recognized that various modifications of the cams 19, 191 can be utilized without deviating from the spirit of the invention. For example, instead of a portion of the cam to control the secondary mover, sufficient slack can be put in the mechanical linkage from the foot pedal to the engine throttle so that the linkage becomes taut only at point A. Between point A and B the engine throttle is opened while a spring action allows pedal travel between point B and F after the engine throttle is completely opened. Various combinations of slack and cam can be utilized to control the secondary mover, e.g., slack to point A, increasing radius to point B, constant radius to point F.

While we have described a system where the first portion of the accelerator pedal controls the prime mover and the next portion controls the secondary mover until its capability is exhausted while the final portion of the pedal travel increases the power on the prime mover to its exhaustion, it may be desirable not to utilize the secondary mover completely before bringing in the prime mover. For example, Otto cycle internal combustion engines produce lower pollution when operating with a lean air to gasoline mixture rather than a rich one. However, at a given engine speed, a typical gasoline engine can produce only about 75% of the power at an air/fuel ratio of 12/1. Thus, it may be desirable to use the engine in a high power and high pollution mode only after the maximum battery power has been utilized. This may be accomplished either electrically or mechanically by the techniques previously described. For example, on reaching point F or F-d the power enrichment circuit can be activated on the secondary mover. Similarly, a portion of cam 19 corresponding to position F-d can be used to engage the enrichment circuit.

It should be understood that the use of pedal position and current or torque levels are interchangable in describing this invention.

During rapid power excursions, the prime mover continues to increase its power until the secondary mover catches up. The speed with which the secondary mover is able to increase its power in response to an input signal determines how much overshoot the prime mover will undergo. Means of dealing with the problem of overshoot are well known to those versed in the art.

4. OverRide

While the basic control concept has been described certain features can be included to accomplish additional desirable objectives. For example, when using control 8, in addition to the control signals described (i.e. pedal position, current, torque), a control activated by the foot pedal or other driver control means can be included to over ride the usual control circuits whenever the accelerator pedal of other driver control is depressed beyond point E as shown in FIG. 6 indicating driver command for high power. Whenever the accelerator pedal is depressed beyond point E, the secondary mover engine throttle is rapidly opened. Thus, the secondary mover engine throttle is fully opened and is commanded to supply full power whenever the accelerator pedal is fully depressed. The over ride control can be either mechanical (i.e. a linkage from the foot pedal to the engine throttle) or electrical (e.g. a circuit activated at point E to rapidly open the throttle such as with a solenoid activated relay or fast motor).

The purpose of the over ride circuit is to insure full engine power whenever the accelerator pedal is fully depressed—whether or not the automatic control is activated, or has yet to achieve the proper engine throttle opening (due to the speed with which it moves).

Secondary mover control circuits utilizing direct mechanical linkages to the accelerator pedal do not require a separate over ride circuit as the mechanical linkage accomplishes the purpose of the over ride automatically on depressing the foot pedal.

5. Combining Power Sources

The instant invention is applicable to many means of combining the outputs of primary and secondary movers that are known to those versed in the art. The general types of combinations to which the instant invention is applicable can be classified as shown in the Table.

TABLE

| CLASSIFICATION OF POWER COMBINATIONS | | |
|---|---|---|
| SECONDARY MOVER | PRIME MOVER | |
| Fixed speed ratio to wheels | Fixed speed ratio to wheels | (1) |
|  | Variable speed ratio to wheels | (2) |
| Fixed speed ratio to prime mover | Variable speed ratio to wheels | (3) |
| Variable speed ratio to prime mover | Variable speed ratio to wheels | (4) |
|  | Fixed speed ratio to wheels | (5) |
| Variable speed ratio to wheels | Fixed speed ratio to wheels | (6) |
|  | Variable speed ratio to wheels | (7) |

The ratios of the speeds among the wheels, prime mover, and secondary mover may be fixed or variable. Variable speed ratios can be achieved through means known to those versed in the art such as variable ratio gear trains. The secondary mover can transmit its power directly to the wheels, independent of the speed of operation of the prime mover (1,2,6, and 7 of the Table), or through a transmission system in conjunction with or through the prime mover (3,4,5 of the Table).

Figure 9:
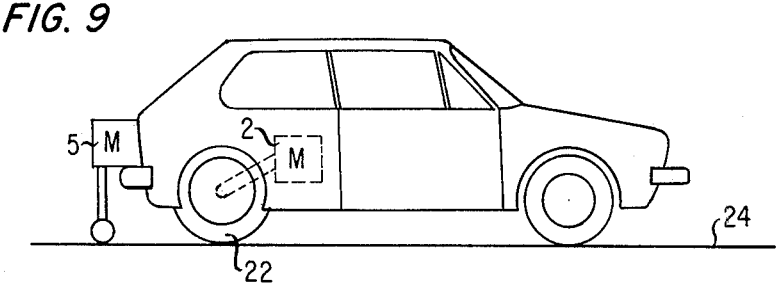
FIG. 9 is an elevational view of an exemplary propulsion system with the prime mover and secondary mover in fixed ratio to one another.
Figure 10:
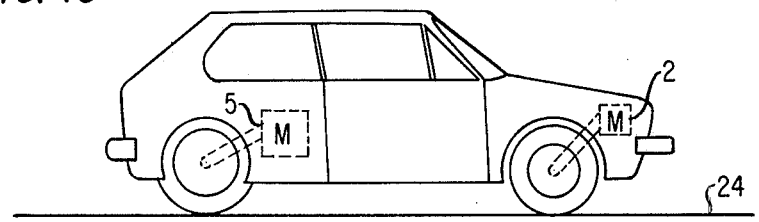
FIG. 10 is an elevational view of a further exemplary propulsion system.
Figure 11:
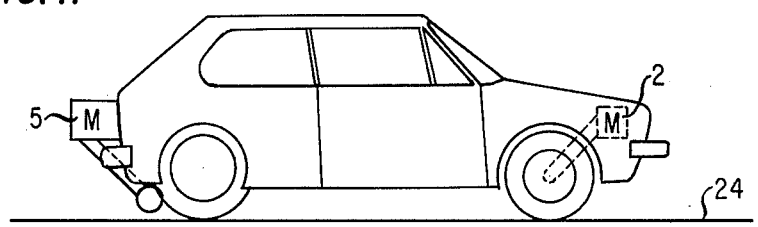
FIG. 11 is an elevational view of a further exemplary propulsion system.

In a simple embodiment of the invention shown in FIG. 9, the prime mover 2, secondary mover 5, and wheels 22,23 rotate at some fixed ratio to each other. The prime mover 2 is controlled by the driver by whatever means ordinarily used without a secondary mover 5. Any type of battery operated prime mover 2 known to those versed in the art is applicable to the instant invention. In the version of the invention shown in FIG. 9 the secondary mover is fastened to the rear of the vehicle and transmits its power to a wheel 23 that is in contact with the road surface 24. If the secondary mover is an internal combustion engine then the movement of the vehicle cranks the engine for starting purposes and the stopping of the vehicle stalls the engine. In equivalent versions of this embodiment of the invention the power of the secondary mover can be inputed into the system through a linkage to the drive shaft as shown in FIG. 10 or in one of the vehicles wheels as shown in FIG. 11. Features of this embodiment are that they are simple to construct and thus less expensive than more complex versions and they lend themselves to retrofit and add-ons for temporary use.

Figure 12:
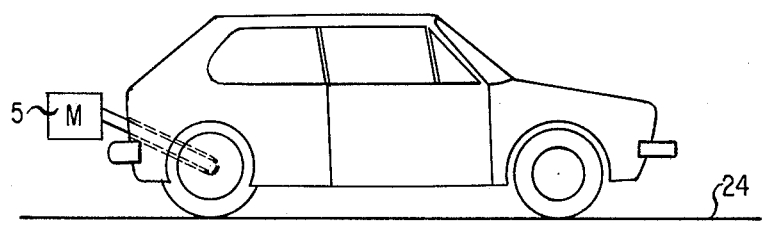
FIG. 12 is an elevational view of a further exemplary propulsion system.

Many operators of a vehicle may be satisfied with the vehicle's operating characteristics for most applications and not want to incur any additional expense and/or any other drawbacks of two power sources on a permanent basis. The principles of the instant invention are especially advantageous when employed in utilizing a second power source for temporary use to assist during those driving missions when desired. An example of such a use would be whenever the operator desires to take a trip of greater range than that within the capability of a single charge of the battery or whenever heavier than usual loads are called for. FIG. 4 indicates how such an arrangement could be utilized in a trailer 20 that is attached to the vehicle for the purpose of such an assist. An important advantage of this arrangement is that, unlike motor generator powered trailer assists known in the art, this arrangement requires no electrical power connections to the main system, only control signal connections. The current sensor can be an inductive pick-up and so there is no need to break in to the electrical system even for signal connection, let alone to break into the electrical power system. This makes the technique applicable to a wide variety of vehicles. There are no problems concerning voltages, frequency, or load carrying capabilities of the main system. While a current signal is easy to obtain and easy to hook up, the invention is applicable to any of the other types of signals described previously when used in the form of a temporary assist. A particular use for a powered trailer in addition to the ones previously mentioned for extending the range and for increasing power capability would be to act as an emergency assist to rescue vehicles where the power output of the electrical systems have dropped below the minimum required for effective propulsion. An assist trailer can be brought to the vehicle and connected so that the vehicle can drive home under its own power rather than be towed or recharged as is the practice now. The assist device, even though temporary, can be connected to the main system by a provision included for such a purpose as shown in FIG. 12.

Figure 13:
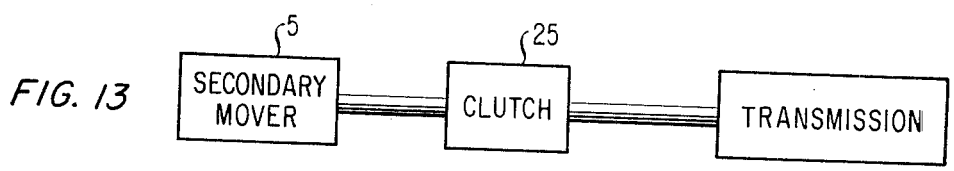
FIG. 13 is a schematic view of a secondary mover output including a clutch.

A drawback to these embodiments is that certain speed dependent losses in the secondary mover, such as friction, are being incurred even when there is no demand for secondary mover power. By interposing a clutch 25 between the secondary mover engine 5 and the wheels as shown in FIG. 13, the secondary mover engine may be decoupled from the system as desired and accomplish the function usually described in the art as free wheeling. The clutch may be controlled electrically, either a solenoid activated friction clutch or an electric hysteresis clutch. The operation can be such that the clutch is engaged whenever the control signal is calling for more power, and remains closed until no power is called for from the secondary mover. FIG. 7, previously described, is an example of such a control system. The ability to disconnect or vary the speed ratio of the prime mover allows the interposition of variable gears and idling of the engine. Fluid drive and torque converters may be used with or without changeable gears.

Otto cycle engines tend to be inefficient at low speeds, but more importantly, the power capability of combustion engines increases as the speed of the engine increases. Thus, if the secondary mover can vary its speed ratio with respect to the wheels, it can deliver higher power capability at low speeds than if the speed ratio between engine and wheels remains fixed. If, instead of a friction clutch, a fluid drive or torque converter is placed in the system, the engine can be made to speed up to deliver high power at low speeds, as is done in conventional combustion engine vehicles presently. With the use of a fluid coupling, an auxiliary means of starting the engine is required (not shown). This can be a self-starter motor known to those versed in the art or it can be a temporary mechanical coupling to the wheels. A variable speed gear may be interposed instead of a clutch to decouple the engine from the wheels. The gear can be operated to allow the secondary mover engine to operate in its most efficient region to deliver the required power by means known to those versed in the art.

Systems in which the secondary mover power is transmitted to the wheels independent of the prime mover are best suited to retrofit, add-on, or temporary attachments, although such a system can advantageously be used in initial designs.

Figure 14:
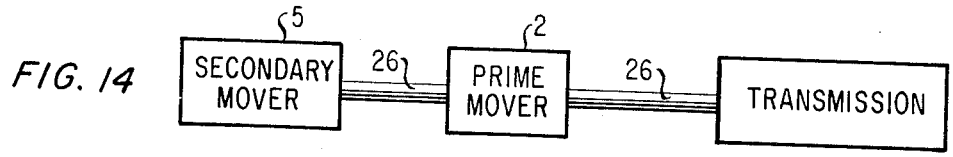
FIG. 14 is a schematic view of a propulsion system with the prime mover and secondary mover on a common drive shaft.
Figure 15:
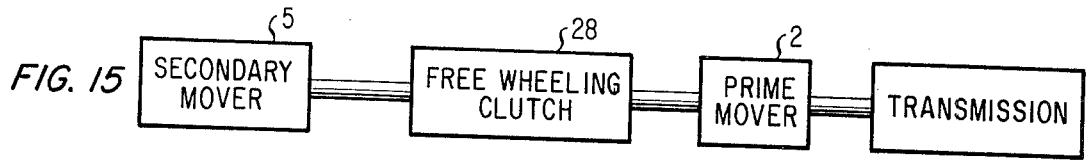
FIG. 15 is a schematic view of a propulsion system in which the prime mover and secondary mover are connected through a free-wheeling clutch.

It is often advantageous from component placement considerations to mechanically couple the prime mover and secondary mover or have the power of both the prime and secondary movers transmitted to the wheels by means of a common linkage 26 (e.g. a common drive shaft). Such an arrangement is shown in FIG. 14. If the speed ratio of the prime mover to the wheels is fixed, then conceptually this is the same as shown in FIG. 10 if we consider the road surface 24 as the coupling means between the prime 2 and secondary 5 movers. If the prime mover idles, such as when a shunt wound motor with field control is used, the engine need not be turned off or decoupled from the prime mover at vehicle standstill. Starting and stopping is a major cause of high vehicle emissions of CO and hydrocarbons. Thus, idling the engine is desirable in minimizing air pollution. As before, further benefit, in terms of fuel economy, can be gained by allowing the engine 5 to free wheel, as shown in FIG. 15. The free wheeling clutch 28 is engaged, as before, whenever power is called for from the secondary mover 5.

6. Application to Non-Electric Prime Movers

Figure 16:
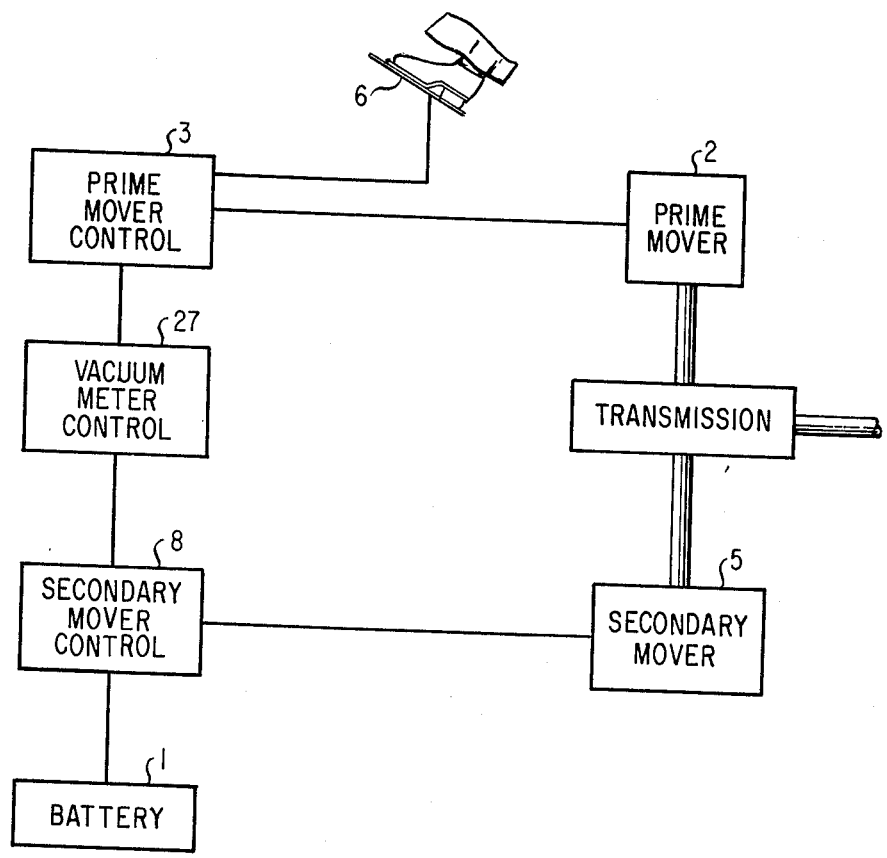
FIG. 16 is a schematic view of an exemplary propulsion system using the prime mover manifold vacuum as the indicator of prime mover stress.

The teachings of this invention with regard to using the control signal to command the performance of a secondary mover can be advantageously used with non-electric prime movers. The emphasis on fuel economy has increased production of vehicles with small engines. It is known that automotive engines are designed to operate only intermittently at high loads and that the average loading is well below the peak loading. Heat removal and other engine systems are not normally designed to accommodate high loadings for long periods of time without overheating or other deleterious effects (certain truck and bus engine systems which are much heavier than equivalent rated automobile engines are designed to accommodate high loadings for extended periods of time). A secondary mover can be used to assist a combustion engine when the vehicle must handle a heavy load or when the vehicle will encounter unusually heavy loading (e.g. rapid acceleration). Component arrangements described for electric prime movers are applicable to non-electric prime movers. Control signals that are useful for combustion engine prime movers are: torque (strain), pedal or prime mover throttle position, manifold vacuum (manifold pressure). FIG. 16 is a depiction of a layout using manifold vacuum as a control signal. Vacuum monitor 27, which is analogous to contact making meter 4, controls the secondary mover as before. The setting for B is adjusted to a loading value desired for maximum continuous prime mover operation. As before, whenever the manifold pressure is above set point B, the secondary mover is given a command to increase its power. Whenever the manifold pressure is below set point A, the secondary mover is commanded to lower its power. At pressures between A and B, the secondary mover throttle remains fixed. An advantageous embodiment is where the prime mover 2 is a gasoline engine and the secondary mover 5 is a shunt wound electric motor.

With gasoline engine vehicles, one of the factors usually considered in deciding upon a threshold value at which the prime mover (in this case, the electric motor) is to be brought in is air pollution. For example, in gasoline engines, minimum production of carbon monoxide and hydrocarbons in the engine exhaust are produced at air fuel ratios of greater than 15/1, at which point the engine is producing about 70 to 80% of its peak torque capability. An additional 20 to 30% power can be produced at maximum throttle opening by decreasing the air to fuel ratio, for example, to the order of 12/1, but with an attendant increase in the production of carbon monoxide and hydrocarbons. Similarly, the threshold value can be adjusted to accommodate other pollutants. The instant invention can maximize low emission operation of the vehicle by setting the threshold value in the most favorable operating region of the prime mover. This leaves the other unfavorable emission regions available for use, but minimizes the time periods in which they are used.

An advantage of the use of this embodiment in automobiles is that the use of the secondary mover eliminates the need for the conventional starter motor, alternator, and flywheel. The secondary mover performs all of the functions of a starter motor and alternator and can act as an electric flywheel in maintaining smooth power transmission from the engine. The secondary mover acts as a generator during the peak power part of the engine cycle and as a motor during the other parts of the cycle, leading to smooth operation in the same manner as a flywheel.

What is claimed is:

1. A vehicle propulsion apparatus comprising:
   (a) a prime mover;
   (b) a secondary mover including an output controller, for activating the secondary mover;
   (c) a drive train;
   (d) a transmission, which said transmission couples the output torque produced by the said primary and secondary movers, to the drive train;
   (e) a sensor adapted for sensing the state of stress of the prime mover and producing a response related to the state of stress of the prime mover; and
   (f) a control for accepting the response and activating the secondary mover, up to the full output capacity of the secondary mover, whenever the state of stress of the prime mover is above a preselected threshold value, in which the control also includes an electrical control motor and means adapted for causing the motor to progressively depress the output controller of the secondary mover when the state of stress of the prime mover is above the preselected threshold value.

2. Apparatus of claim 1 in which the control includes means for causing the motor to progressively release the output controller when the state of stress of the prime mover is less than a second threshold value which is less than the said preselected threshold value.

* * * * *